United States Patent [19]

Lebraut

[11] Patent Number: 5,307,602
[45] Date of Patent: May 3, 1994

[54] SETTABLE FITTING ALLOWING THE FIXATION OF FACADE LINING OUTER PANEL BOARDS

[76] Inventor: Richard Lebraut, 40 rue des Cormiers, 78400 Chatou, Yvelines, France

[21] Appl. No.: 777,929

[22] Filed: Oct. 17, 1991

[51] Int. Cl.$^5$ .......................... E04B 1/38; E04B 2/30
[52] U.S. Cl. ...................... 52/698; 52/235; 52/508; 52/509
[58] Field of Search ............... 52/508, 509, 513, 698, 52/265, 249, 235

[56] References Cited

U.S. PATENT DOCUMENTS

| 3,450,427 | 6/1969 | Fischer | 52/513 |
| 4,768,322 | 9/1988 | Kafarowski | 52/508 |

FOREIGN PATENT DOCUMENTS

| 2577256 | 8/1986 | France | 52/509 |

Primary Examiner—Michael Safavi
Attorney, Agent, or Firm—Pollock, VandeSande and Priddy

[57] ABSTRACT

There is fixed, on a wall, a section member having a substantially U-shaped portion provided with an upper leg extended by a lug formed with a window adapted for setting in position an appropriate retaining member in a position chosen on the wall. A vertical central zone of the U-shaped portion is provided with an opening through which passes a rotatable retaining member having an inner screw thread and a front portion provided with a thinned-out zone adapted for retaining a nut. A threaded rod is screwed into the retaining member and terminates into a flattened portion through which extends a vertical channel adapted for receiving a pin that maintains by penetration a lower lining panel board and an upper lining panel board. A counter nut is provided to lock the threaded rod on the retaining member.

7 Claims, 1 Drawing Sheet

SETTABLE FITTING ALLOWING THE FIXATION OF FACADE LINING OUTER PANEL BOARDS

FIELD OF THE INVENTION

The present invention is directed toward a new and improved settable fitting member for fixation of facade lining outer panel boards.

BACKGROUND OF THE INVENTION

Presently, many service buildings such as office buildings, study centers, etc., are erected very quickly from a concrete framework, and facades of the buildings are provided with covering outer lining panel boards made of various materials such as ferrous alloys, plastics materials, natural or regenerated stone slabs, anodized aluminum boards, etc.

In order to fix these lining panel boards, there are used fitting members which are fixed on the outer face of a wall, and a length setting element provides a perfect verticality of the facade lining. The lining panel boards are thus in a same plane in order to provide the finished building with a perfect aspect quality and on which the light can play, without any defect being visible.

The devices known till now, however, do not allow an easy setting of the lining panel board support elements since the fixity of the setting element is difficult to obtain. Actually, it is necessary to take into account the movements of the ground and various oscillations generated by the traffic of land and underground vehicles.

OBJECT OF THE INVENTION

The present invention remedies this disadvantage by providing a perfectly lockable simple settable fitting member for the fixation in a vertical plane of facade lining outer panel boards.

Moreover, these fitting members permit applying, if necessary, an insulation layer such as glass wool, synthetic fibers or the like, thereby providing an extra thermal and acoustic protection to the building. Actually, between the wall of the building and the lining panel boards, there are present on the one hand an air cushion and on the other hand an insulation layer.

SUMMARY OF THE INVENTION

According to the invention, the settable fitting member for fixation of facade lining outer panel boards comprises a section member having a lower portion substantially in the shape of a U and having an upper branch which is vertically extended by a straight lug provided with a window for setting in position an appropriate retaining member in a position chosen on the wall, a vertical central zone of the U-shaped fitting member is provided with an opening through which passes a retaining part with an inner screw thread and having a front portion provided with a thinned-out zone adapted for maintaining a nut so as to lock the retaining part on the section member and ensure an entrainment thereof, a threaded rod terminating into a flattened portion through which extends a vertical channel adapted for receiving a pin maintaining by penetration a lower lining panel board and an upper lining panel board, the threaded rod being displaceable by screwing and unscrewing the nut, to adjust the upper lining panel board in position on the lower lining panel board, the rod being outwardly threaded in correspondence with the inner screw thread of the retaining part, whereby a displacement of the rod is obtained by screwing and unscrewing the nut, a counter-nut being provided to lock the rod on the retaining part.

According to another feature of the invention, a brake washer is provided to keep the nut clamped by a partial overlapping by means of lugs folded over the central zone of the section member and another lug penetrating into the nut.

Various other features of the invention will become more apparent from the following detailed description.

BRIEF DESCRIPTION OF THE DRAWINGS

An embodiment of the object of the invention is shown by way of a non limiting example in the accompanying drawings, wherein.

DETAILED DESCRIPTION

Figure 1:
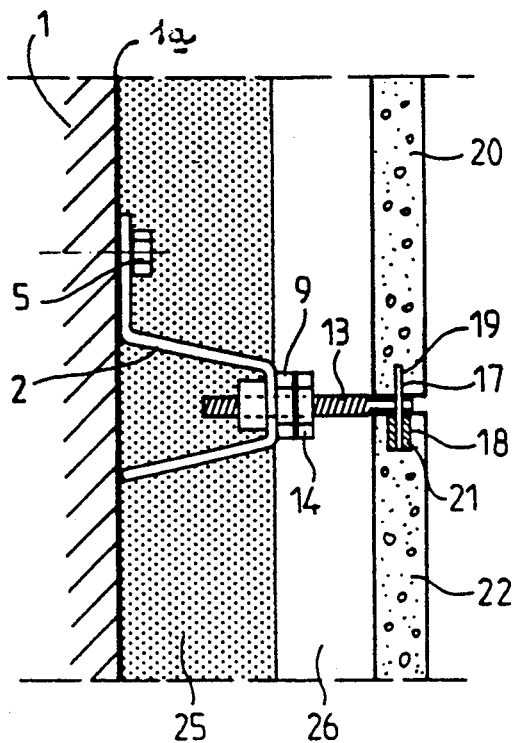
FIG. 1 is a partial elevation sectional view of a wall of a building carrying a settable fitting member for fixation of lining panel boards.

Referring now to the drawings, and especially to FIG. 1, there is shown a vertical wall 1, made for example of concrete, but the face 1a of which is not plane since the concrete has been poured without being smoothened.

On the front face 1a of the vertical wall 1, retaining fitting members are fixed, by standard means, in previously determined positions by marking for example horizontally equidistant and parallel lines and vertically other equidistant lines so that at each crossing position of the horizontal and vertical lines there is fixed a settable fitting member. The settable fitting member is composed of a section member 2, of a substantially U-shape, the upper leg 2a of which is extended vertically by a lug 3 provided with a window 4 through which passes a retaining member such as a bolt 5 for attaching the member 2 to wall 1. The vertical median zone 2b of member 2 is provided with a circular opening 6 inside which is engaged a retaining part 7 provided with an inner screw thread shown at 8 and having, in its front portion, a thinned out zone 7a retaining captive a nut 9 via a ring 7b.

Figure 3:
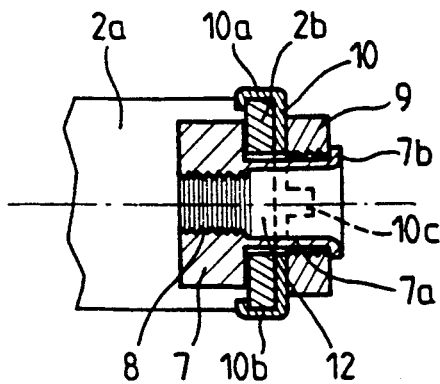
FIG. 3 is a detailed view of FIG. 2.
Figure 4:
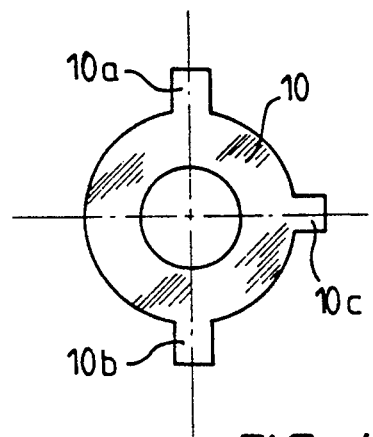
FIG. 4 is a plan view of a particular element of the settable fitting member.
Figure 2:
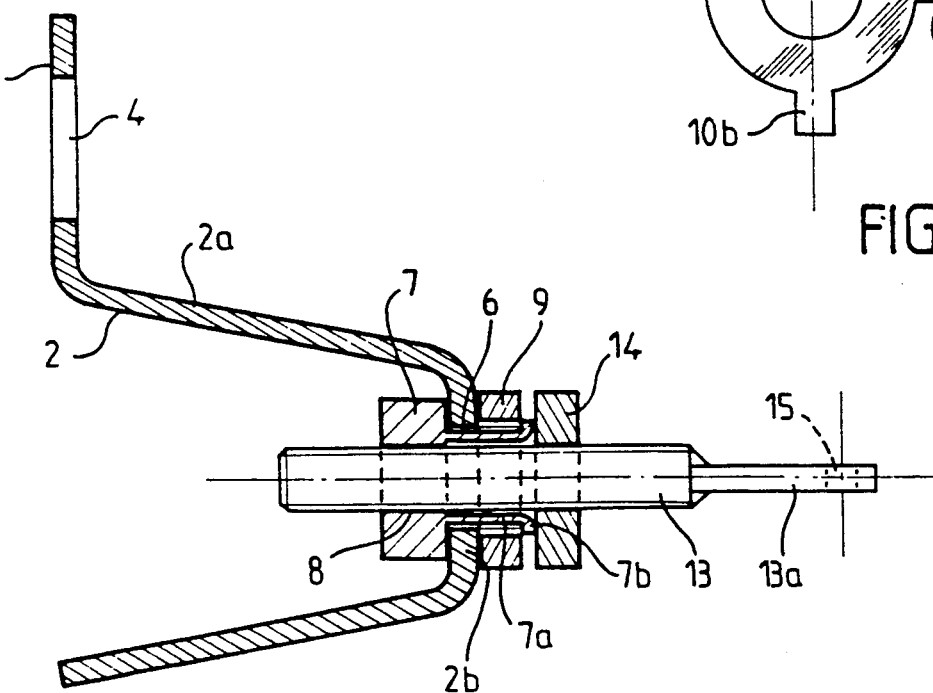
FIG. 2 is an enlarged vertical cross sectional view of the fitting member.

As shown in FIGS. 3 and 4, there is also provided a washer 10 having lugs 10a, 10b which provide, when the nut 9 is correctly screwed, a braking of the nut 9. The lugs 10a, 10b, are folded over the portion 2b of the fitting member 2, to retain the washer 10 in position while a lug 10c of the washer 10 locks the nut 9 on retaining part 7 by penetration, for example in a recess, in a per se know manner.

In a central channel 12 of the retaining part 7 which ends in inner screw thread 8, there is screwed a threaded rod 13 carrying a second nut 14. This threaded rod 13 has at its front end a flattened portion 13a in which is formed a hole 15. Thus, once the threaded rod 13 has been correctly screwed in the inner screw thread 8, the flattened end portion 13a of the rod 13 will occupy a position which places the central axis of the hole 15 in a vertical plane, or any other suitable plane as required.

When holes 15 in the plurality of fitting members on wall 1 are all perfectly in the same vertical plane or the like, it is possible to engage in each hole 15 a vertical pin 17 (see FIG. 1) which carries at its lower portion a plastics sleeve 18. The upper portion of pin 17 is adapted to extend into a hole 19 of an upper lining panel board 20 while the lower portion of pin 17 extends into a hole 21 of a lower panel board 22 by including therein the plastics sleeve 18.

When the lower panel board 22 is in position, the upper panel board 20 is placed atop, and the spacing between wall 1 and these two panel boards 22, 20, one on the other, is then adjusted by screwing or unscrewing the nut 9 to rotate retaining part 7 and thereby move the threaded rod 13 in translation, and without rotation, between the legs of member 2.

After the two panel boards are properly positioned relative to wall 1, the nut 14 is clamped on the terminal portion of the extension 7b of the retaining part 7 with assistance of the same wrench used for rotating the nut 9. There is thus obtained a perfect fixation of the threaded rod 13 which is perfectly locked and which can, under no circumstances, be displaced under effect of vibrations. It is thus possible to realize linings of facades or curtain walls which are perfectly plane and therefore do not show any apparent defect, whatever are on the one hand the material constituting the lining panel boards and, on the other hand, the anchoring angle of these lining panel boards.

The arrangement shown in FIG. 1, includes a thermal and acoustic insulation layer 25, and an air cushion 26 completing the insulation. The parts which form the settable fitting member are made of a material resistant to the destructive agents in the environment in which the fitting members are to be mounted.

What we claim is:

1. A device for vertically aligning facade panel boards in superposed substantially coplanar relation to one another and for holding the aligned boards in position at a desired distance from a vertical wall, comprising a substantially U-shaped member having a pair of legs that are interconnected to one another by an intervening leg, means for attaching said member to a wall surface with said pair of legs adapted to extend horizontally away from said wall and with said intervening leg adapted to extend generally parallel to and spaced outwardly from said wall surface, said intervening leg having a circular aperture therein, an internally threaded retaining element rotatably mounted in said aperture, an elongated externally threaded rod in threaded engagement with the internal threads of said retaining element, said rod extending in a generally horizontal direction when said device is attached to a wall, adjustment means for selectively rotating said threaded retaining element to move said elongated rod in nonrotational translation between said pair of legs, a pin at a remote end of said rod, said pin being oriented in a direction generally parallel to said wall surface when said device is attached to a wall and having portions that extend above and below said remote end of said rod, said portions of said pin being adapted respectively to engage recesses in a pair of facade panel boards that are to be vertically aligned with one another at positions relative to said wall surface determined by rotation of said threaded retaining element, and means for thereafter locking said retaining element against rotation to maintain said rod and pin at adjusted fixed positions relative to said wall surface.

2. The device of claim 1 wherein said means for attaching said U-shaped member to a wall surface is adapted to position said pair of horizontal legs one above the other, said means for attaching including an extension of one of said legs having an aperture therein for receiving a bolt.

3. The device of claim 1 wherein said adjustment means comprises a first nut surrounding a nonthreaded cylindrical extension of said retaining element.

4. The device of claim 3 wherein said cylindrical extension includes a ring that overlies a surface of said first nut to retain said first nut in position axially relative to said retaining element.

5. The device of claim 3 including a washer disposed in coaxial relation to said first nut, said washer having lugs that are folded over portions of said intervening leg.

6. The device of claim 3 wherein said means for locking comprises a second nut disposed in coaxial relation to said first nut.

7. The device of claim 1 wherein said remote end of said rod is flattened and has a hole therein for slidably receiving said pin.

* * * * *